United States Patent [19]

Chen et al.

[11] Patent Number: 4,970,714
[45] Date of Patent: Nov. 13, 1990

[54] ADAPTIVE DATA LINK PROTOCOL

[75] Inventors: Mon-Song Chen, Edison, N.J.; Barry C. Goldstein, Chappaqua, N.Y.; Hanafy E. Meleis, Yorktown Heights, N.Y.; Dominick A. Zumbo, Pughkeepsie, N.Y.

[73] Assignee: International Business Machines Corp., Armonk, N.Y.

[21] Appl. No.: 294,086

[22] Filed: Jan. 5, 1989

[51] Int. Cl.$^5$ .............................................. H04J 3/26
[52] U.S. Cl. ..................................... 370/17; 370/94.1; 371/32
[58] Field of Search ....................... 370/60, 85, 94, 61, 370/79, 85.1, 94.1, 13, 17; 371/32

[56] References Cited

U.S. PATENT DOCUMENTS 4,527,267  7/1985  Cohen .
4,677,614  6/1987  Circo .
4,677,616  6/1987  Franklin ................................ 370/94
4,736,369  4/1988  Barzilai et al. ........................ 370/94

OTHER PUBLICATIONS

"VAXclusters: A Closely-Coupled Distributed System" by N. P. Kronenberg et al., in ACM Transactions on Computer Systems, vol. 4, No. 2.

Primary Examiner—Douglas W. Olms
Assistant Examiner—Meluin Marcelo
Attorney, Agent, or Firm—Perman & Green

[57] ABSTRACT

A communication system provides high speed transmission of data over a link, such as a fiber optic link, between a first terminal and a second terminal. The architecture and protocol permits the use of dedicated hardware such as state machines constructed of programmable array logic units, to synchronize the transmission and reception of data packets and the retransmission of designated ones of these packets in the event of a faulty transmission. Packets to be transmitted and received are stored in an array of frames in sub-windows of a memory storage window in each of the termianls, the frame number being equal to the sequence number of the data packet. By embedding sequence and status bits in each packet within control words and bits appended to each packet, the state machine in each terminal can readily track the progress of each packet so as to request acknowledgement of error-free receipt, to send an acknowledgement, to request a retransmission of a packet designated by its serial number and to distinguish a retransmitted packet from an original packet transmitted with error.

17 Claims, 17 Drawing Sheets

FRAME STRUCTURE OF DATA MESSAGE

FIG. 7
FRAME STRUCTURE OF DATA MESSAGE
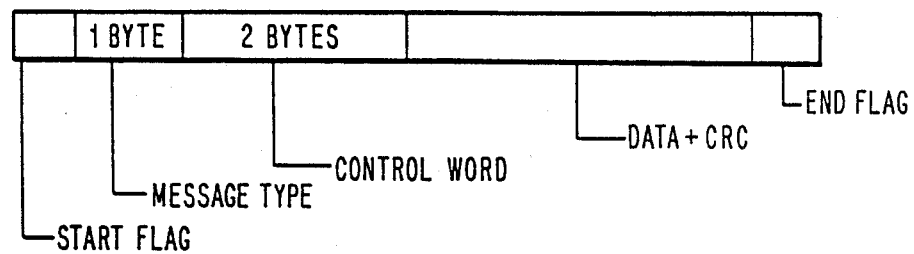
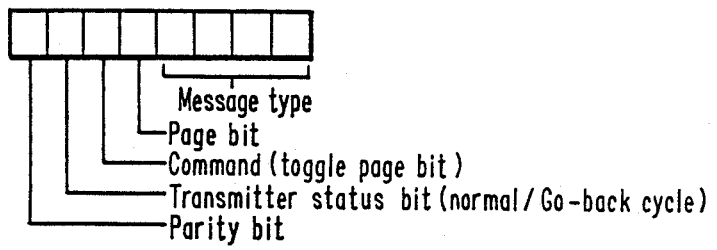
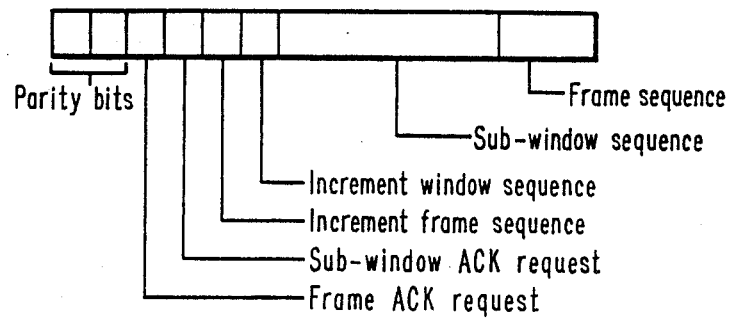

FIG. 8
ACK MESSAGE FRAME STRUCTURE
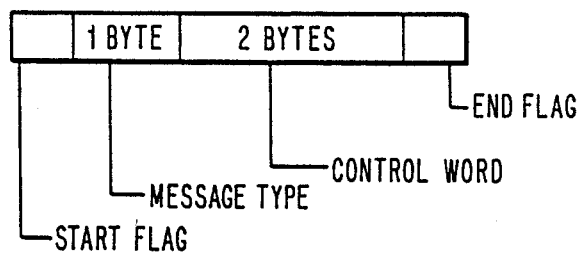
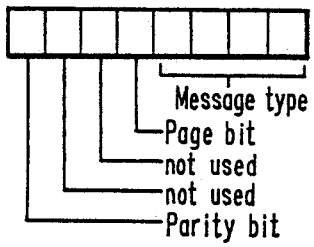
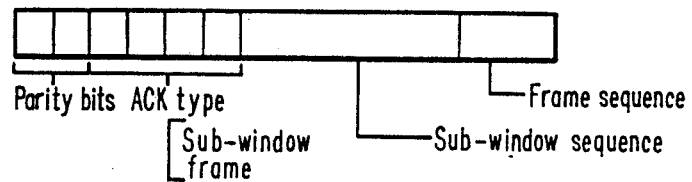

FIG. 9
ERROR MESSAGE FRAME STRUCTURE
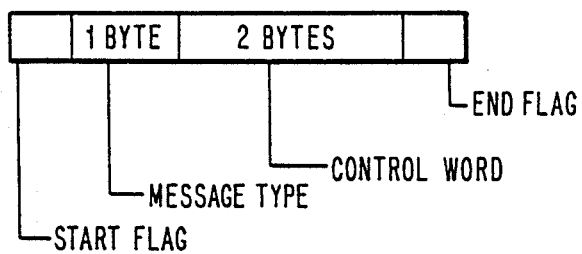
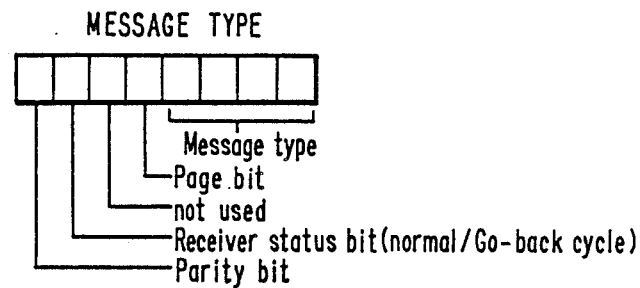
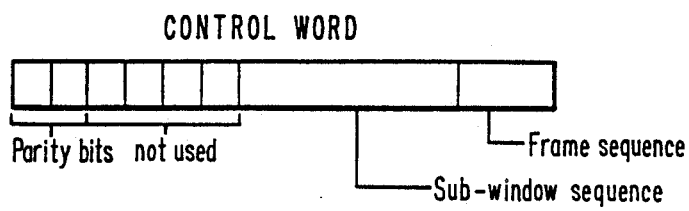

FIG. 10
"I NEED STATUS" FRAME STRUCTURE
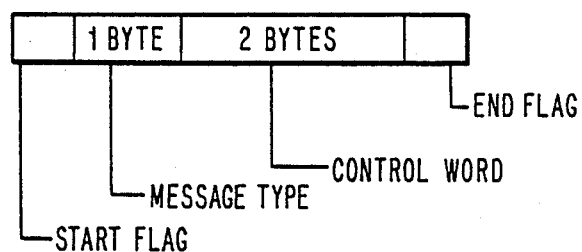
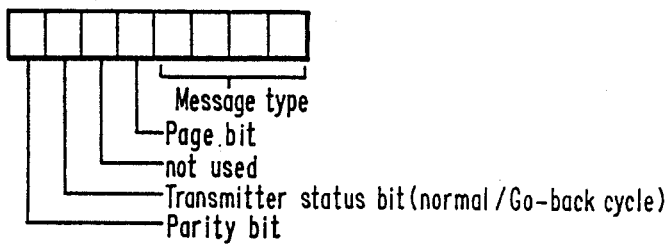
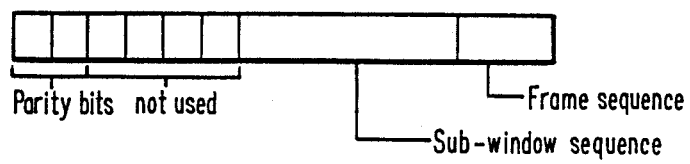

FIG. 11
"RECEIVER STATUS" FRAME STRUCTURE
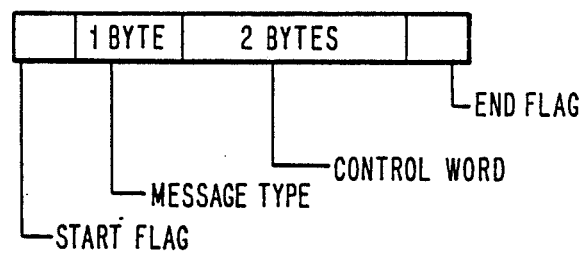
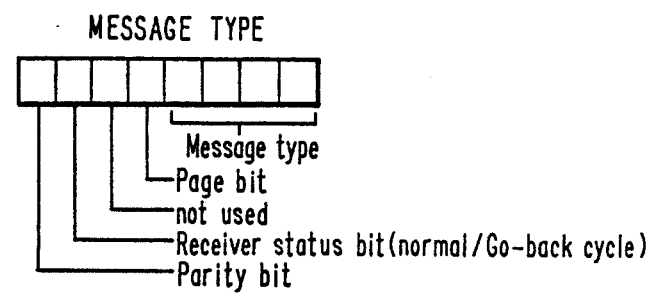
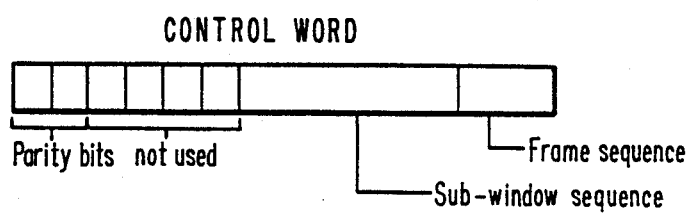

FIG. 12
"ARE YOU THERE" AND
"I AM OK" FRAME STRUCTURE
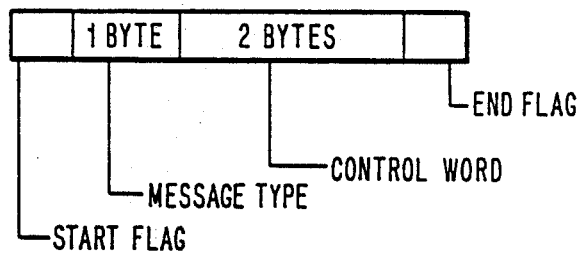
MESSAGE TYPE
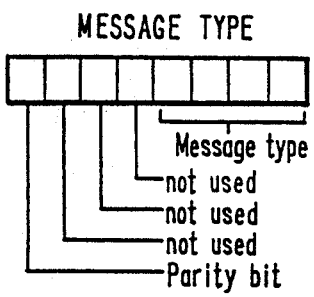
CONTROL WORD
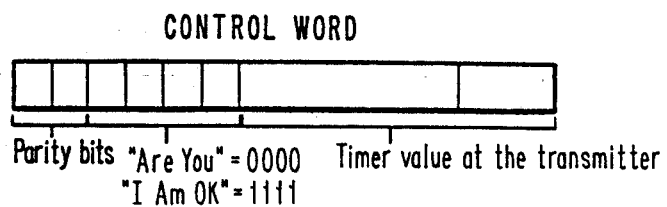

NORMAL DLC TRANSMISSION AND ACKNOWLEDGE

FIG. 14

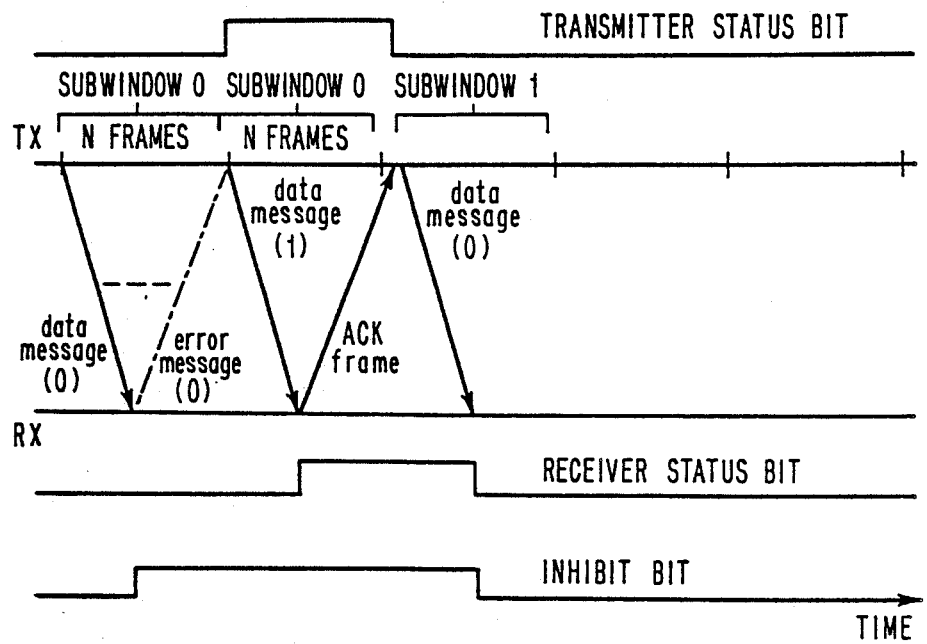

DLC error recovery mechanism

- Erroneous data message sets Inhibit bit and initiates error message
- Active inhibit bit prevents restarting timer
- Error message has a timeout (timer stopped if RX status bit = 1)
- Error message with RX status bit = 0 sets TX status
- Data message with TX status bit = 1 sets RX status
- ACK message (frame or window) or Error message with RX status = 1 resets TX status bit
- Data message with TX status bit = 0 or "I need status" message resets the RX status and inhibit bit

ADAPTIVE DATA LINK PROTOCOL

BACKGROUND OF THE INVENTION

This invention relates to architecture for a data link control protocol suitable for a duplex digital data transmission system employing error recovery based on a GO-BACK-N algorithm for retransmission of data frames of a window subsequent to the detection of an error and, more particularly, to the construction of such an architecture with a digital word format permitting parallel processing of individual bits of a word to allow for error detection and recovery at rates commensurate with the high data-transmission rates of pulsed optical communication links.

Digital communication systems are widely used for communicating digitized data among people who use the data. For example, such data may include pictorial information sent by facsimile, textual data for publishing purposes, and numeric data as may be employed by computer companies, the latter two forms of data being transmitted frequently by the use of modems connected to a telephone line or high-speed data line. Large amounts of data to be transmitted over a single communication link are generally multiplexed and modulated onto an electromagnetic carrier for transmission over a coaxial cable, or pulse modulated onto a light beam for transmission by fiber optics.

Of particular concern herein is the situation wherein large amounts of data are to be transmitted at high speed over a communication link, particularly a two-way, or duplex, optical fiber communication link. The data is transmitted, typically, in the form of batches or packets along with some form of coding, such as a cyclic redundancy check (CRC), which allows for a receiver to verify that the received packet of data may be regarded as being free of error. In the event that an error has been detected, then the packet is rejected, and the receiving terminal requests the transmitting terminal of the communication link to retransmit the rejected packet. The capacity for transmitting the request for retransmission is provided by the duplex link wherein transmission is possible in both directions.

In the use of such communication systems, considerable electric circuitry and complexity of equipment is entailed for identifying and maintaining synchronization between packets which have been transmitted, packets which have been received, and packets which are yet to be transmitted. Such identification and synchronization is particularly important for the case wherein a request is made for retransmission of certain packets to insure that there is no confusion as to which packet is to be retransmitted, and whether or not a specific packet has been received.

An example of a communication system for communicating digitized data among a group of computers is disclosed in an article entitled "VAXclusters: A Closely-Coupled Distributed System" by N. P. Kronenberg, H. M. Levy, and W. D. Strecker in ACM Transactions on Computer systems, Vol. 4, No. 2. This article discloses a star-shaped array of data buses with arbitration and acknowledgement of buses for connecting between two terminals. U.S. Pat. No. 4,527,267 of Cohen, issued July 2, 1985, discloses a communication system with administration of acknowledgement packets, and employs an internal protocol of a transport switching network with windows of authorized data packets to be transmitted. U.S. Pat. No. 4,677,614 of Circo, issued June 30, 1987, discloses a multi-node loop form of communication system wherein any one of the nodes can assume the role of a master node to provide a time base for the loop.

A problem arises in that the microprocessor circuitry which has been available, heretofore, for selecting the packets to be transmitted, for identifying packets, and for maintaining synchronization among the transmitted and received packets has restricted the maximum speed of data transmission along the link. The restriction arises by virtue of the fact that the microprocessor circuitry is itself limited by the speed at which it can function. As higher communication speeds have become available, particularly with optical fiber links, full advantage of the higher speed capabilities of the links has not been realizable because of the restriction on the speed of response of the microprocessor circuitry which controls the operation of the communication link.

SUMMARY OF THE INVENTION

The foregoing problem is overcome and other advantages are provided by a communication system in which a communication link provides two-way communication between two terminals at the ends of the link. Data is transmitted along the link in the form of data packets, wherein each packet also includes control words and status bits which identify each packet by a sequence, and carry messages such as a request for an acknowledgement of successful transmission, and to indicate a retransmission of a packet when such retransmission has been requested because of a communication error. The inclusion of status bits and control words with the packets facilitates the construction of a communication system wherein sequencing, synchronization, and error recovery can be accomplished by dedicated circuitry, including state machines, which are hard-wired for rapid operation, rather than by use of general purpose microprocessors which would accomplish the foregoing tasks at a slower rate.

Synchronization is facilitated by the use of a pair of memories, one at each terminal, wherein storage compartments are arranged in the same fashion within each memory. In each memory, the storage compartments are divided among data frames, with groups of frames being arranged as sub-windows of a window. The window is the complete array of frames in the memory. The sequence number of each packet is equal to the number of the frame in which the data is stored. The data in each frame is transmitted as a separate packet. Upon receipt of a valid packet, the data is stored in the corresponding frame of the received memory. All packets are checked for error before being stored in the received memory. The omission of the packet is readily determined by comparison of sequence numbers of received packets with an incoming packet. This arrangement is readily implemented by use of programmable array logic (PAL) units in the construction of state machines which can operate faster than a general purpose microprocessor in carrying out the synchronization function.

A request for an acknowledgement signal is included within the packet at the end of each sub-window. However, in accordance with a feature of the invention, transmission of subsequent frames need not be delayed until an acknowledgement signal has been received. Rather, the transmission of subsequent frames is allowed to continue for a predetermined amount of time, whether or not the acknowledgement signal has been received. When an acknowledgement signal is received, status bits are changed from "awaiting acknowledgement" to "acknowledgement received", the status bits being appended to the corresponding data packet in the transmit memory. For this purpose, it is noted that the data of all frames is retained in storage in the main memory until the complete window has been sent. The retention of the data permits retransmission of data packets in the event that a faulty transmission has occurred. By appending the status, such as "awaiting acknowledgement", alongside the corresponding packets in the last frame of each sub-window, a PAL unit can readily review the status of the frames to determine whether an acknowledgement (Ack) signal has been received.

The invention provides for an error recovery mechanism implemented by the data link control. Upon detection of an error in data or a sequence error by the receiving terminal, the receiving terminal transmits a message to the transmit terminal indicating that there has been a faulty transmission and, further indicating the sequence number of the data frame for which the fault occurred. The transmit terminal goes back to the sub-window and frame specified in the error message, and resumes transmission with the sub-window and frame specified in the error message. In the first packet of the retransmission, a status bit is set to indicate that this a retransmission. The receiving terminal upon seeing the message with the indication of retransmission, and upon properly receiving this packet, sends the Ack message with the status bit indicating that the acknowledgement is in response to the retransmitted data packet. This informs the data transmit terminal that the GO-BACK procedure has been completed.

It is also critical to maintain a timer within the transmit terminal for timing the time interval elapsed during the data recovery procedure. Timing of the recovery interval begins upon reception of the error message, and is terminated upon receipt of the status bit indicating that the GO-BACK procedure has been completed. The timer is also operated in the event that a status of Awaiting Acknowledgement is found in the status bits of each data frame stored in the transmit memory. The transmit terminal inserts the message "I Need Status" within the data packet and starts the timer. The timer is reset when the "Awaiting Ack" is alleviated by receipt of an Ack signal or upon completion of a data recovery procedure. Should the elapsed time exceed an allowable amount, a warning indicator is activated to alert personnel at the transmit terminal. The use of the status bits in cooperation with the timer provide for greater efficiency during the link re-synchronization cycle after a packet error.

It is noted that the system architecture operates independently of the data packet size because all of the control words and status bits are set in a portion of the data packet separate from the data itself, and separate from a cyclic redundancy check (CRC) code which is employed in checking for error in transmission. Therefore, the data portion of a transmitted packet may be small, large, or varied in length in accordance with the adaptive capability of the system. Variation of the number of frames between a request for acknowledgement, as well as variation in the length of the data portion of each packet permits the acknowledgement signals be sent more or less frequently depending on the system response to error rate, packet or bit error rate, along the communication link. For high quality transmission links, the error rate is so low that it is highly unlikely that more than one bit per packet would be in error. Therefore, as a practical matter in the implementation of the system, the bit error rate and the packet error rate may be regarded as being the same.

BRIEF DESCRIPTION OF THE DRAWING

The aforementioned aspects and other features of the invention are explained in the following description, taken in connection with the accompanying drawing wherein:

FIG. 7 shows the frame structure of the data message transmitted by the system of FIG. 1;

FIG. 8 shows the message frame structure of an acknowledgement message;

FIG. 9 shows the frame structure of an error message;

FIG. 10 shows the frame structure of a message requesting status;

FIG. 11 shows the frame structure of a message conveying status of the receive terminal;

FIG. 12 shows the frame structure of two messages, "Are you there" and "I Am Okay".;

FIG. 14 is a timing diagram showing operation of the DLC error recovery mechanism;

DETAILED DESCRIPTION

Figure 1:
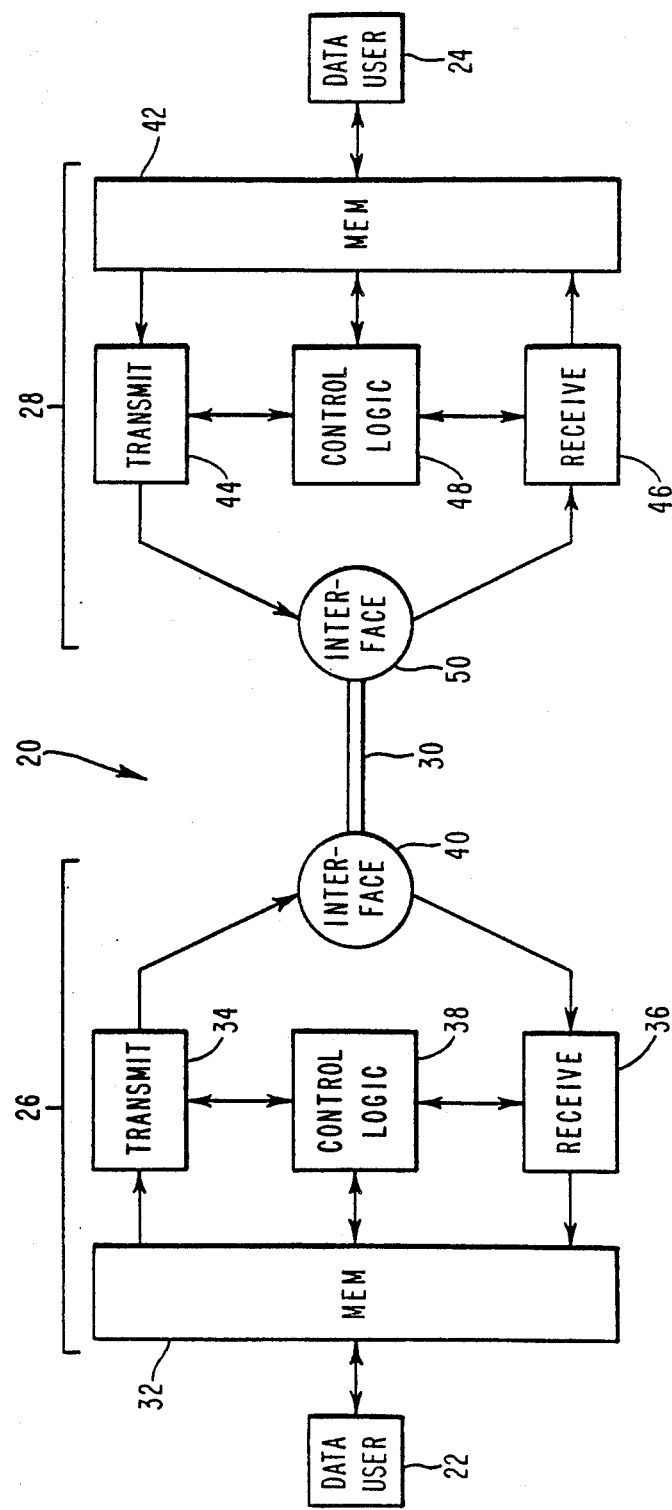
FIG. 1 is a diagrammatic view of a communication system employing the invention, the system comprising a transmit terminal and a receive terminal joined by a communication link.

FIG. 1 shows a two-way (duplex) data transmission system 20 allowing two users 22 and 24 to communicate with each other. The system 20 comprises two terminals 26 and 28 coupled by a full duplex data transmission link 30. The link 30, by way of example, may be constructed of two optical fibers wherein one optical fiber provides simplex transmission of data and control signals from the terminal 26 to the terminal 28, and the second optical fiber providing simplex transmission of data and control signals from the terminal 28 to the terminal 26. Alternatively, the transmission link 30 may be constructed of a coaxial cable or a telephone transmission line to provide for the duplex transmission; however, full advantage of the invention can only be attained with the high-speed transmission of an optical link. The terminal 26 connects with the user 22, and the terminal 28 connects with the user 24.

In the practice of the invention, the two terminals 26 and 28 are constructed of the same components, and are operated to provide their respective functions of transmission and reception. The terminal 26 comprises a memory 32, a transmitter 34, a receiver, a control logic unit 38, and an interface 40. Similarly, the terminal 28 comprises a memory 42, a transmitter 44, a receiver 46, a logic unit 48, and an interface 50. In the terminal 26, the control logic unit 38 connects with the memory 32, the transmitter 34, and the receiver 36 for the application of control signals to operate these units. Similarly, in the terminal 28, the control logic unit 48 connects with the memory 42, the transmitter 44 and the receiver 46 for applying control signals to operate these units. The interfaces 40 and 50 operate to couple signals between the link 30 and the transmitters 34, 44, and the receivers 36, 46.

Operation of the system 20 may be demonstrated by the transmission of data from the user 22 to the user 24. In accordance with the invention, the data is first stored in the memory 32 so as to become available to the transmitter 34 for transmission to the terminal 28. Under control of the logic unit 38, the data from the unit 32 is entered into the memory 32 by arranging the data in the memory 32 as a set of frames which, together, form a window of data. The window is divided into sub-windows to facilitate data transmission, as will be described hereinafter. The window is outputted to the transmitter 34 under control of the logic unit 38 for transmission via the link 30. In the usual operation of the system 20 in the case of a relatively low bit error rate (BER), each frame is transmitted as a separate data packet comprising data and control words, as well as an error correction code, a message type, and flags designating the start and end of a packet, as will be described hereinafter in further detail. If desired, particularly in the case of high error rates, the length of a frame and the corresponding length of the data portion of a packet may be reduced.

In accordance with a feature of the invention, the transmission of a sub-window is preceded by a header identifying the number of frames in the sub-window. Furthermore, control signals embedded in the control words and the message type of each packet identify each frame of the sub-window to enable the receiving terminal 28 to compare the anticipated sequence of frame arrivals with the sequence of frames as actually received. The data frames are received by the receiver 46, the receiver 46 also providing an error check of each data word by a cyclic redundancy check (CRC) to verify that data in each frame head is valid. Valid data from each packet is stored as a frame of a window in the memory 42. However, invalid data is discarded, and is not stored in the memory 42. The result of such invalid data is to alter the sequence of stored frames in the memory 42 from that which has been expected. Furthermore, in response to the invalid data, the transmitter 44 is activated to transmit a signal back to the transmitting terminal 26 requesting that the present sequence of frame transmission be stopped and that the transmission be restarted with the frame containing the faulty packet. In this way, the window of the memory 42 is filed with data which accurately matches the data originally stored in the window of the memory 32. The memory 32 retains storage of the data, even after transmission of the data, until such time as an acknowledgement signal has been transmitted from the receiving terminal 28 to the transmitting terminal 26 to acknowledge that all of the data has been correctly received. Thereupon, the data is dumped from the memory 32 to provide space for receiving further data from the user 22. Also, the data of the memory 42 is transferred to the user 24 with a clearing of the memory 42 so as to permit entry of further data. By virtue of the foregoing operation, which will be described in further detail hereinafter, the system 20 is able to transmit data accurately from the user 22 to the user 24. The system 20 can operate in the same fashion in the reverse direction so as to enable the transmission of data from the user 24 to the user 22.

Figure 2:
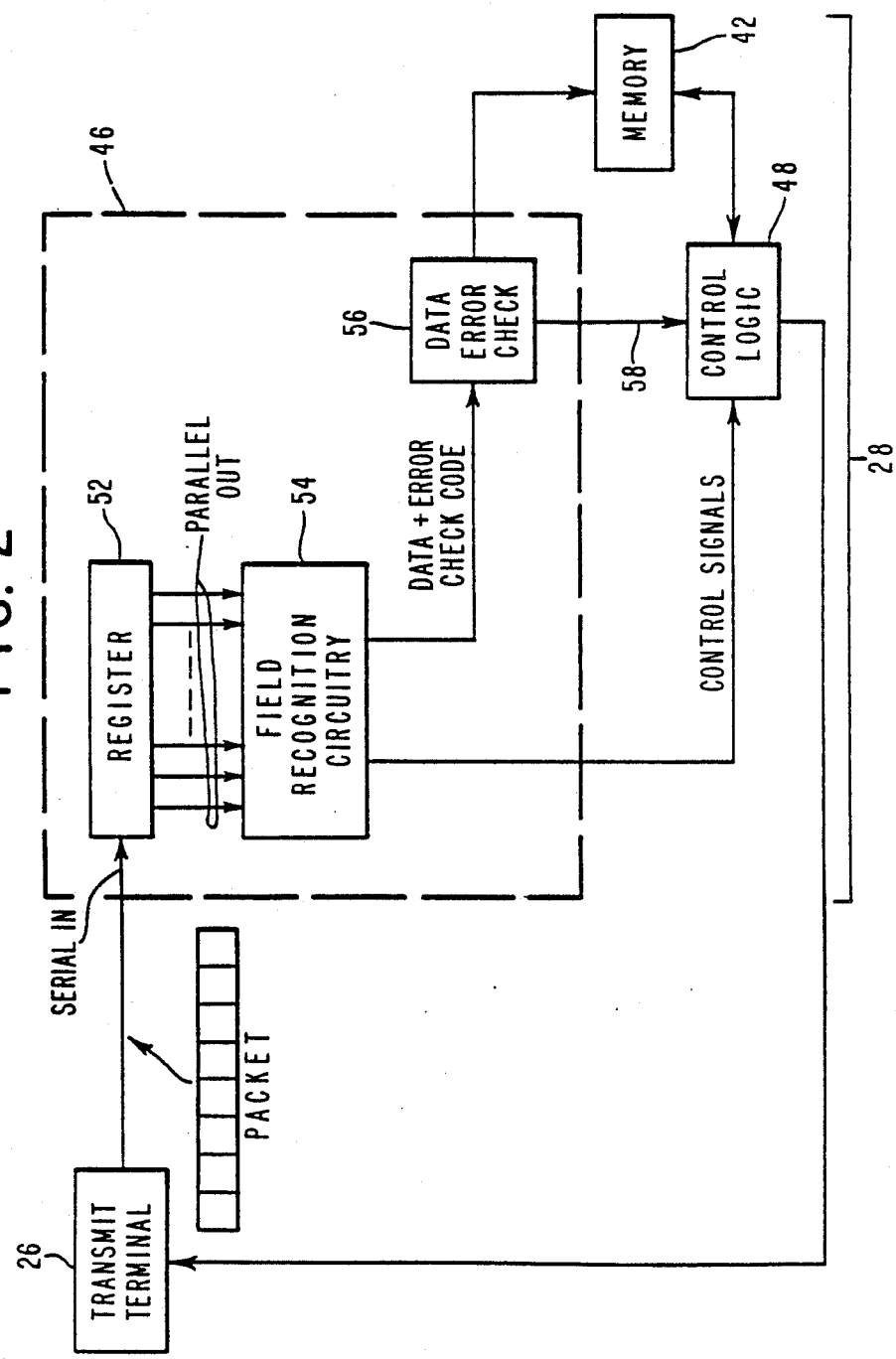
FIG. 2 shows parallel processing of serially-transmitted bits of a data packet in the system of FIG. 1 for high-speed checking of packets for data and sequence errors.

FIG. 2 is useful in explaining a further feature of the invention wherein control signals are embedded in each packet for controlling operation of the system 20. The control signals may be present in a packet irrespectively of whether or not the packet contains any data. With reference to the foregoing example, a packet traveling from the terminal 26 to the terminal 28 contains both control signals and data. In contrast, an acknowledgement signal and a signal requesting a retransmission would be transmitted in a packet which carries no data. The transmission of bits of each packet is conducted in serial fashion along the link 30. For example, in the case wherein the link 30 is fabricated of optical fibers, and wherein a pulsed electric signal of the transmitter 34 is converted by the interface 40 into pulses of light for transmission along the fiber, the bits of each packet are transmitted along the fiber serially. Similarly, in the case wherein the link 30 is constructed as a coaxial cable, the bits may also be formed as a pulse modulation of an electromagnetic carrier signal in which case the bits are transmitted serially.

Serially transmitted signals are converted into a parallel signal, by use of a shift register 52. The parallel output lines are applied to field-recognition circuitry 54 which identifies the various fields in each packet so as to permit rapid extraction of the control signals from the packet. Data and an error checking code are outputted by the recognition circuitry 54 to a data error checker 56 which operates in a well-known fashion to make the data available for entry into the memory 42, and to output a check signal on line 58 indicating whether or not the data is error free. The check signal on line 58 is applied to the control logic unit 48 for use in the generation of a request for retransmission of data, as will be described hereinafter. The parallel processing of the respective fields of a packet enables the circuitry of the receiving terminal 28 to operate at the same rate at which the data is being transmitted.

As a further feature of the invention, it is noted that a window of the memory 32 may be divided into smaller sub-windows each of which has a reduced number of frames so as to increase the frequency at which acknowledgement signals are received from the receiving terminal 28 back at the transmitting terminal 26. The increased rate of acknowledgement signals is most useful in the case of a noisy environment at the link 30 wherein higher error rates may exist. This reduces the total number of frames which may have to be retransmitted in the event of an error being detected within a sub-window. The changing of the sub-window size can be accomplished automatically by the system 20 by counting the number of negative-acknowledgment (NACK) signals during a predetermined interval of time. These functions are accomplished by use of the control logic units 38 and 48.

Figure 3:
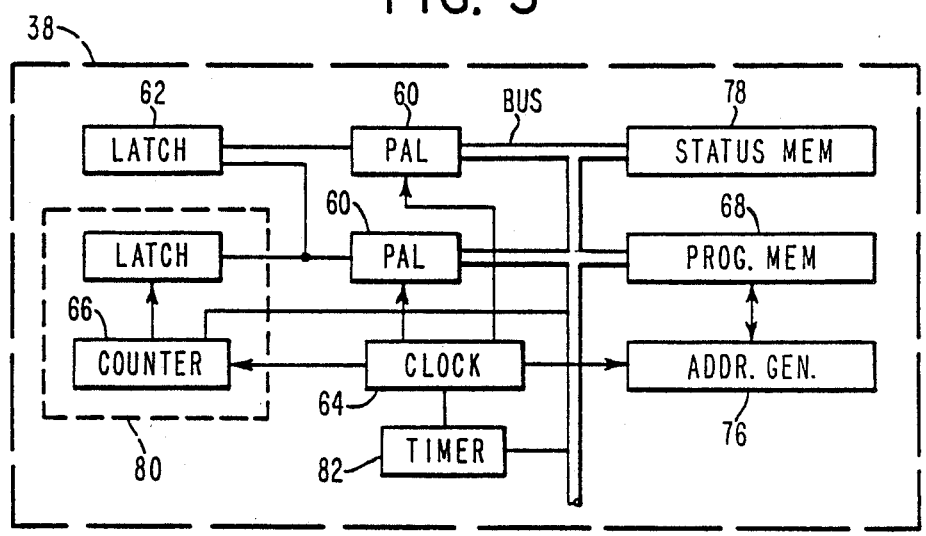
FIG. 3 shows components of a control logic unit of FIG. 1 for implementing data link control in a hard-wired state machine for rapid control of synchronization and data recovery procedures for the system of FIG. 1.

With reference to FIG. 3, rapid speed of operation of the logic unit 38 is attained by constructing the unit 38 of programmable array logic (PAL) unit 60 in conjunction with latches 62, a clock 64, and a counter 66. PAL units 60 are available commercially and are readily connected and programmed to perform a fixed logic routine. The latches 62, which may be constructed as type-D flip-flops, are employed to store the bits of digital signals representing specific states of the system 20, such as a state of waiting for an acknowledgment signal, a state of an empty memory frame ready to receive new data, or a state of a loaded memory frame ready to discharge data. Additional commands, as well as a sequence of commands, may be stored in a program memory 68. The interconnection of the counter 66, and the memory 68 with the latches 62 and the PAL units 60, as shown in FIG. 3 represent a typical interconnection scheme, and are provided to demonstrate the use of these elements in the construction of the logic unit 38. It is understood that the total number of PAL units 60 and latches 62 is dependent upon the specific programming and logic functions to be provided by the logic unit 38 as will be discussed hereinafter. It is noted also that the logic unit 48 is constructed in the same fashion as the logic unit 38 and, accordingly, the explanation of the logic unit 38 is to be understood to apply also to the logic unit 48. The control logic unit 38 also includes an address generator 70, responsive to the PAL unit 60, for addressing the memory 32 to select frames, or portions of a frame into which data is to be written and from which data is to be read out.

By virtue of the foregoing operation of the system 20, as well as the architecture and protocol employed in the construction and operation of the system 20, the system 20 is capable of providing for accurate transmission of data at substantially higher data rates than has been available heretofore. The novel features of the architecture and protocol which make the operation possible is explained now in further detail by reference to the specific arrangement of frames in the window, and the specific formatting of packets to provide for the embedding of control signals within a data-carrying packet.

For the correction of errors detected in the transmission of data, there are three modes of correction in common practice for communication systems. One mode is to repeat the transmission of a packet of data which was determined to be defective during the initial transmission. In a second mode, the serial transmission of a succession of data packets is stopped, and the transmission sequence reverts back to the packet with the faulty data for a retransmission of this packet along with all subsequent packets of the sequence which may have already have been transmitted. In a third mode of error correction, additional information is transmitted with each data packet, which information is sufficient to regenerate a portion of data which has been lost or corrupted during a transmission. As is well known, each of these modes may be useful in particular situations depending on error rate, the rate of transmission speed, and the availability of a transmission in the reverse direction to notify a sender of a transmission failure. The invention is intended for use in a duplex data transmission system which allows for the transmission of messages to the sender acknowledging whether data has been accurately received or whether there has been a faulty transmission of the data. Therefore, only the first two of the foregoing data correction modes are candidates for use in the system of the invention.

Figure 4:
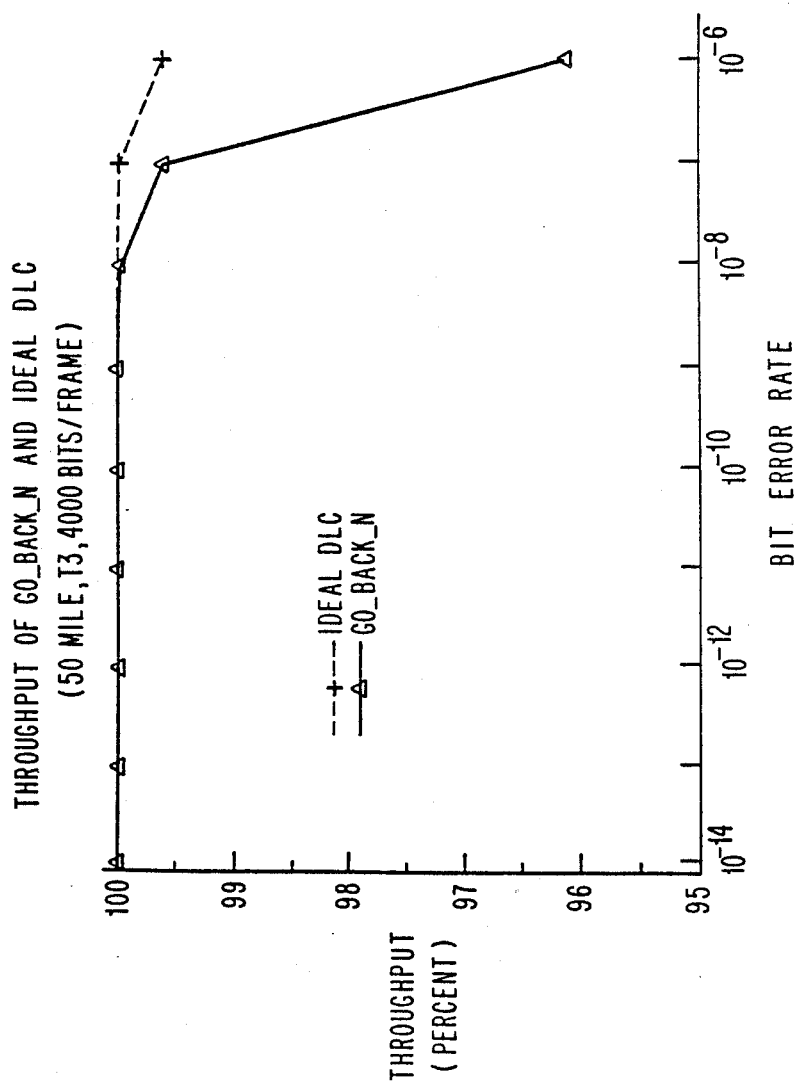
FIG. 4 is a diagram showing transmission efficiency as a function of bit error rate (BER) for use of a data recovery cycle in one scheme wherein only a faulty packet is retransmitted, and in a second scheme wherein the faulty packet plus succeeding packets which may have been transmitted are retransmitted.

FIG. 4 shows the efficiency of data transmission, as a function of bit error rate, for the first two of the foregoing modes of data correction. In a sense, the selective repetition of only a data packet experiencing a faulty transmission would be the ideal protocol for data link control because this mode minimizes a number of packets which must be retransmitted. However, the second of the foregoing modes, namely the retransmitting of a sequence of data packets beginning with the packet experiencing the failure can be more easily implemented in terms of the construction of the transmission system. FIG. 4 shows that for a relatively low BER, the two modes of correction provide essentially the same throughput efficiency. Accordingly, either of these two modes may be employed in the construction of a high-speed low-BER transmission system. The second mode, namely the retransmission of the sequence of packets beginning with the faulty packet is employed in the construction of the system of the invention.

Figure 5:
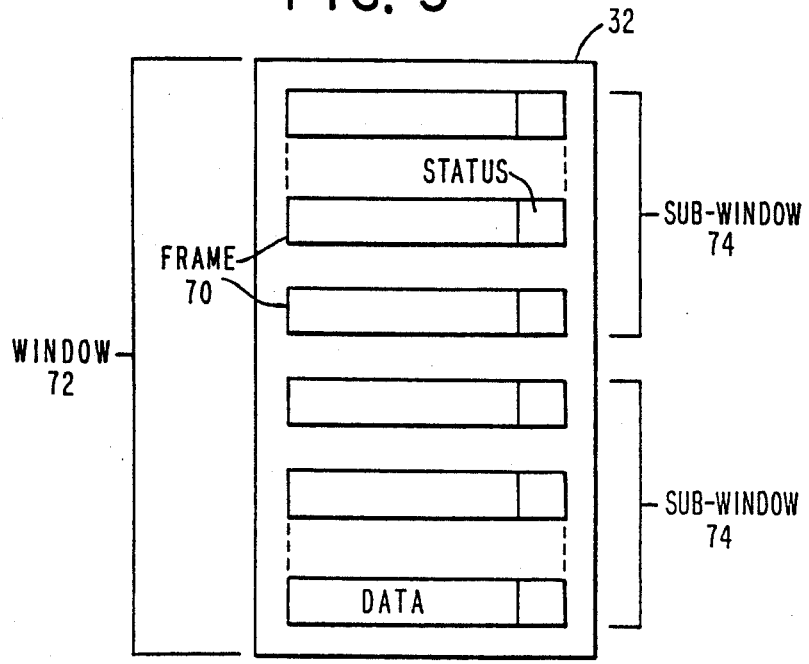
FIG. 5 is a diagrammatic view of a memory employed in each of the terminals of FIG. 1 for defining a window, a sub-window, and a frame.

FIG. 5 presents a diagram of a memory 32 showing an arrangement of frames 70 in a window 72. The window may be divided into sub-windows 74 for improved efficiency of data transmission in an environment of increased bit error rate. The frames 70 are selected by the address generator 76 (FIG. 3) in accordance with a program to be described hereinafter. Generally, a packet of data comprises the data of a single frame 70. However, if desired, a data packet may be configured with a smaller quantity of data, such as the data stored in one-half of a frame 70.

Each of the sub-windows define sequences of frames of data to be transmitted from the user 22 to the user 24. At the conclusion of the transmission of data packets of all of the frames of a sub-window, an acknowledgement signal (Ack) is sent from the terminal 28 back to the terminal 26. After transmission of data packets of all of the frames of the window 72, the frames of the window are cleared to receive further data from the user 22.

In the event that negative acknowledgement (NACK) in the form of an error signal, indicating an unsuccessful transmission of data, is received, the error signal includes identification of the frame containing the data of the unsuccessful transmission. Then, in response to the error signal, the data of that frame plus the packets of data of the succeeding frames are retransmitted from the terminal 26 to the terminal 28. Thereupon, assuming that successful acknowledgement is received, the series of data transmissions proceeds with the next sub-window. The operation of the system 20 in accomplishing these retransmissions will be explained now in terms of the system architecture and protocol.

Figure 6:
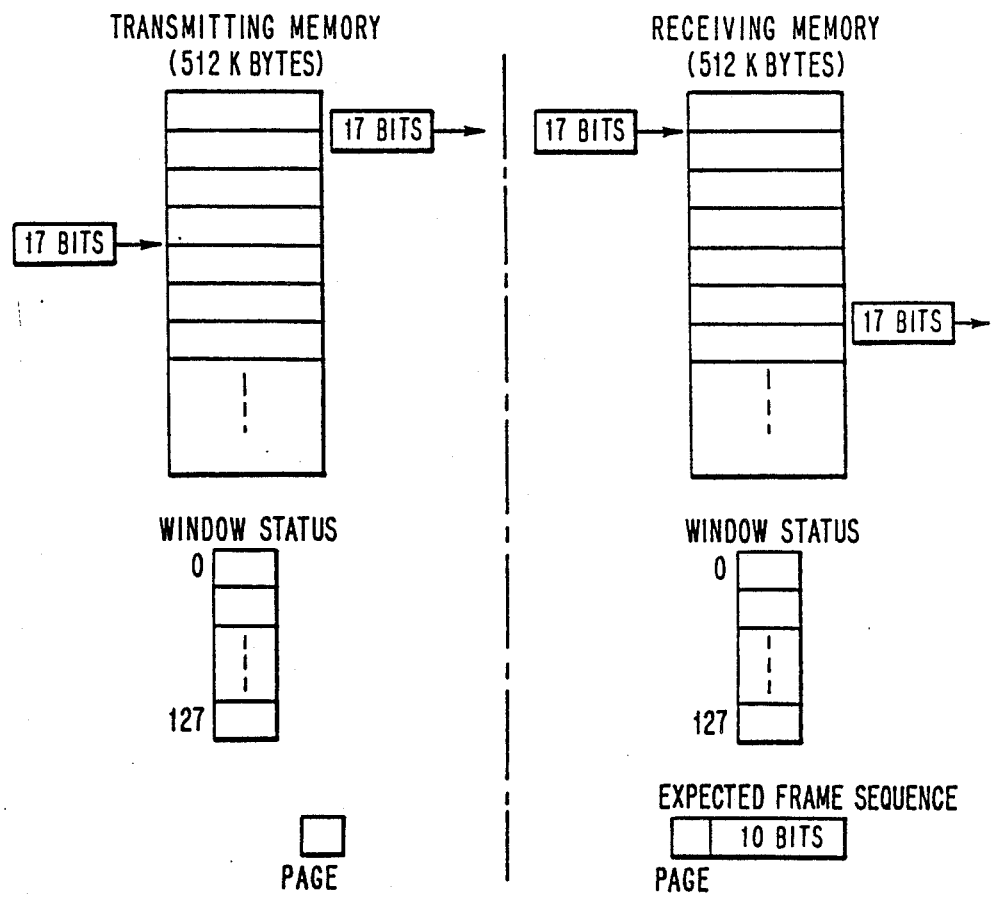
FIG. 6 is a diagram explaining memory architecture employed in the data link control (DLC) for the system of FIG. 1.

FIG. 6 shows the arrangement of frames of the transmitting memory 32 of the transmitting terminal 26, and the frames of the receiving memory 42 of the receiving terminal 28. FIG. 6 is useful in describing the memory architecture of the data link control. By way of example in construction of a preferred embodiment of the invention, each of these memories provides for the storage of 512 K bytes of data. There are 1,024 frames 70 each of which has storage of 512 bytes. During the transmission of data of the various frames from the terminal 26 to the terminal 28, the data is transmitted from each frame sequentially wherein the sequence number of each frame is equal to the address of the frame and the memory. FIG. 6 and the succeeding FIGS. 7–14 will be used to describe the novel features of the invention in terms of a protocol suitable for a high speed data link control (DLC). As noted above, the framing of the data messages and the mechanism for error recovery is based on the GO-BACK-N algorithm wherein N is the number of frames back in the sequence wherein error was noted in a data packet.

This description covers two important considerations in the design of the DLC architecture, namely, management of each data memory (memories 32 and 42) and the form of the frame structures. A multiple window scheme, as disclosed above, is employed in the architecture, the multiple window scheme including the window 72 and the sub-windows 74. The memory size of 512K bytes of data has been selected to accommodate the pipelining requirements of a long distance data link, such as an optical link. Each of the sub-windows 74 has the same number of frames 70.

The number of status states employed in the operation of the memory 32 as a transmit memory differs from that employed in the operation of the memory 42 as a receive memory. Also, it is convenient to refer to the window 72 of the memory 32 as a transmit window, while the corresponding window of the memory 42 may be referred to as a receive window. Each transmit window has three status states associated with it, the three status states being identified by two status bits in a status memory 78 of the control logic unit 38. One of the latches 62 in cooperation with the counter 66, under control of the program memory 68, serve to provide the function of a sequencer 80, indicated by the dashed line in FIG. 3. In the case of the control logic unit 38, the status memory may be referred to as a transmit status memory, and in the case of the control logic unit 48, the status memory may be referred to as a receive status memory. Each status memory is configured, by way of example, in a preferred embodiment of the invention, as a scratch-pad memory with an array of 128×9 bits. The states defined by these bits are as follows: (00) Write, (01) Read, (11) Awaiting Ack. If the status of a window or sub-window is Write, then this window is listed to be empty and available for reception of data to be written into this window.

As is well known, in the open system interconnect (OSI) model of system architecture, it is the practice to describe the architecture as being configured of a series of layers, one above the other. For example, there is the physical layer dealing with circuitry components and other equipment employed in the construction of the system 20, the DLC layer relating to the control and operation of the foregoing components, and a network layer from which data is written into a memory of a system 20 and extracted from a memory of the system 20. In the layer description, the physical layer is considered to be below the DLC layer, and the network layer is considered to be above the DLC layer. Other well-known layers are positioned above the network layer but need not be referred to in the ensuing description.

Thus, with respect to the layers of the foregoing OSI model, if the status of a window is Write, this window is empty and available for the layer above the DLC to write into. A status of Read indicates that data stored in the window is ready to be read out of the window and sent from the terminal 26 to the terminal 28 via the data transmission link 30. The Awaiting Ack status indicates that data of the window has been sent, and that the transmit terminal 26 is awaiting an Ack message.

There are two pointers into the transmit memory, namely, a Write pointer and a Read pointer. The Write pointer is controlled by the layer above the DLC layer. The Read pointer is controlled by the DLC layer, and is utilized during both normal transmissions and in error situations. During the transmission of the data of the frames 70 from the memory 32, the control logic unit 38 directs the sending of the data of sub-windows having a status of Read sequentially without waiting for reception of an Ack signal for a previously sent window before advancing to transmission update of the next sub-window. After the data of a sub-window has been sent, the control unit 38 changes the status of the sub-window to (11), Awaiting Ack. Thereafter, in response to the status of (11) at the present sub-window, the DLC layer requests a message from the receiving terminal 28 asking for the status of the logic control at the receiving terminal 28.

The receive memory has the same organization as that of the transmit memory, but employs only two status conditions. The two status conditions are (00) Write and (01) Read. The receive Write status permits the DLC for the receiver to write the received data into the receiver memory. After writing the data into the receiver memory, the receiver DLC changes the status to (01), Read. The layer above the DLC reads the received data and changes the status, at the receiving station 28 to Write (00). The received data at the receiving terminal 28 is checked for CRC errors associated with the transmitted data. A sequence error can also occur, the sequence error being a lack of a match between the number of a received frame and the anticipated number of a received frame. Such lack of match can occur in the event that a data frame has not been received by the receiver 46 due to noise or other source of transmission error.

The data received by the receiver 46 is stored in the received memory 42 only if there are no sequence or CRC errors associated with the data. It is noted that the receiver 46 expects the data of the various frames received sequentially, any deviation from the sequence is flagged by the receiver 46 as an error. If an error is detected, the data associated with this error is discarded, and an error message is sent from the received terminal 28 back to the transmit terminal 26 along with the identifying number of the expected frame.

The receiver 46 discards all incoming packets of data until the expected sequence is received correctly. The sequence number of each frame, as has been noted above is equal to the address of that frame in the transmit memory. The inventive feature of having the sequence number equal to the frames, transmit memory address allows the system 20 to quickly access the receive memory 42 because the arrangement of data storage in the receive memory is an exact image of the arrangement of the storage in the transmit memory. This allows the system 20 to support a high speed data link.

FIG. 7 shows the frame structure of a data message, and FIG. 8 shows the corresponding structure of an Ack message. The structures set forth in both FIG. 7 and 8 illustrate a feature of the invention in which the frame structure comprises two control fields. These control fields carry the type of message, the transmit or receive status bits, and an instruction for the control logic units 38 or 48, each of which functions as a state machine. This instruction allows for the fast serving of incoming messages, and allows the processing of messages at a real time rate. This feature of the invention facilitates the implementation of a DLC protocol which can handle a high speed data link. There are seven types of messages employed in the construction of the invention, namely, Data, Ack (which may be Windowed or Framed), "I Need Status", "Receive Status", Error, "Are You There", and "I Am Okay".

All message types have four basic framing blocks in common. Start Flag, Message Type, Control Word, and End Flag. FIG. 7 illustrates these blocks being used to construct a data message. Along with these four basic blocks, the data message includes further the actual data and CRC for the data. The Start Flag contains four consecutive 1's and is followed by the message type field. The message type field contains four bits of message type, a page bit to indicate which 512K page of transmit memory is presently being processed by the transmit terminal 26, a bit to instruct the receive terminal 28 as to when to toggle its page bit to stay in synchronization with the transmit terminal 26, and a transmit status bit to indicate whether the transmit terminal is in an error condition or not.

The page bit is toggled after the 128th window has been sent by the transmitter terminal 26. The type for data messages is 0001. The transmit status bit is set by an incoming error message with the received status bit equal to 0. The transmit status bit is reset by an Ack message or an Error message with the received status bit set. A parity bit is appended to the seven bits before transmission. The control word is composed of three bits indicating the present frame being sent, seven bits to indicate the present window being sent, two bits to indicate to the receiver 46 when to increment either its window or frame sequencer, and two bits which request an Ack for the window or the frame.

The data portion of the frame is flexible and can be varied according to the BER of the link 30. This is accomplished by varying the length of the data block based on the BER of the link with measurements of the BER being attained as the ratio of erroneous packets versus correct packets per unit time. If the BER of the link increases, the packet size is made to decrease by the control logic unit 38. The feature of the invention, wherein the Ack requests are embedded within the Data messages, allows us to vary the interval of time between Ack requests based on the BER of the link at that time. In relatively high BER conditions, the interval between Ack requests is to be reduced by the control logic unit 38. In low BER conditions, the interval between Ack requests is allowed to increase to a maximum of one request per sub-window. The architecture of the invention is capable of requesting Ack signals for each frame or for any number of frames in accordance with the BER. The CRC portion of the frame is also variable, and can be programmed to 16, 32, 48, or 56 bytes, depending on the amount of error detection coverage required. An end flag, which is signified by a bit stream of 1000, indicates the end of the frame.

FIG. 8 illustrates the frame format for the Ack (Window or Frame) message. This message is generated by the receiver terminal 28 in response to an Ack request by the transmitter terminal 26 in the data message. The message type for an Ack message is 0010. The page bit indicates the page status of the receiver memory 32. The parity bit is generated on the above-mentioned seven bits. The control word contains three bits which indicate the frame being acknowledged, seven bit to indicate the sub-window that is being acknowledged, four bits which indicate the type of Ack (either window or frame) to the control logic unit 38, two parity bits which are generated on each of the seven bit groups and are appended to the control word before transmission.

FIG. 9 shows the format of the error message. The error message is generated by the receiver in response to the reception of an erroneous data message, such as an invalid sequence number or CRC error. The message type for an error message is a 0101. The page bit indicates receiver page status. The receiver status bit indicates whether the receiver is in a normal mode or in an error mode. The parity bit is generated to confirm the validity of the above-mentioned bits. The control word is made up of three bits that indicate the erroneous frame, and seven bits which indicate the erroneous window. These bits along with the page bit are used by the transmitter control unit 38 to allow the transmitter terminal 26 to go back and retransmit data, starting at a specific frame. Two parity bits are appended to the control word to ensure the validity of the bits within the word.

FIG. 10 illustrates "I Need Status" message. This message is generated by the transmitter terminal 26 when the DLC pointer encounters a window with a status "Waiting for Ack". The message type for this message is 0011. The page bit indicates the page on which the transmitter control unit 38 detects a status of "Waiting for Ack". The transmitter status bit indicates the mode of the transmitter terminal 26, either normal or error. A parity bit is appended to ensure the validity of the message type bits. The control word is made up of three bits which indicate the frame which has not been acknowledged. The control word further comprises seven bits which indicate the sub-window of the packet which has not been acknowledged. Two parity bits are appended to ensure data integrity.

FIG. 11 shows the structure of the receiver status message. This message is generated by the receiver terminal 28 in response to the "I Need Status" message. The message type for this message is 0100. The page bit indicates the page status of the receiver memory 42. The receiver status bit indicates the status of the receiver terminal 28, error or normal. A parity bit is provided for data integrity. The control word is composed three bits which indicate the expected frame, seven bits which indicate the expected window, and two bits to ensure data integrity by a checking of parity.

FIG. 12 illustrates the messages for "Are You There" and "I Am Okay". The message types for these messages are 0110 and 0111, respectively. A parity bit is added to the message type to ensure data integrity. The control word is made up of ten bits which are used as a time stamp to indicate when this message was sent. The control word further comprises four bits which are either 0000 or 1111 indicating messages of "Are You There" or "I Am Okay", respectively. This redundancy is used to ensure that the message is interpreted properly. Two parity bits are also used in the control word to ensure its integrity. This message is used on power-up to calculate the round-trip loop time and also to validate link continuity during prolonged times of idle link conditions.

Figure 13:
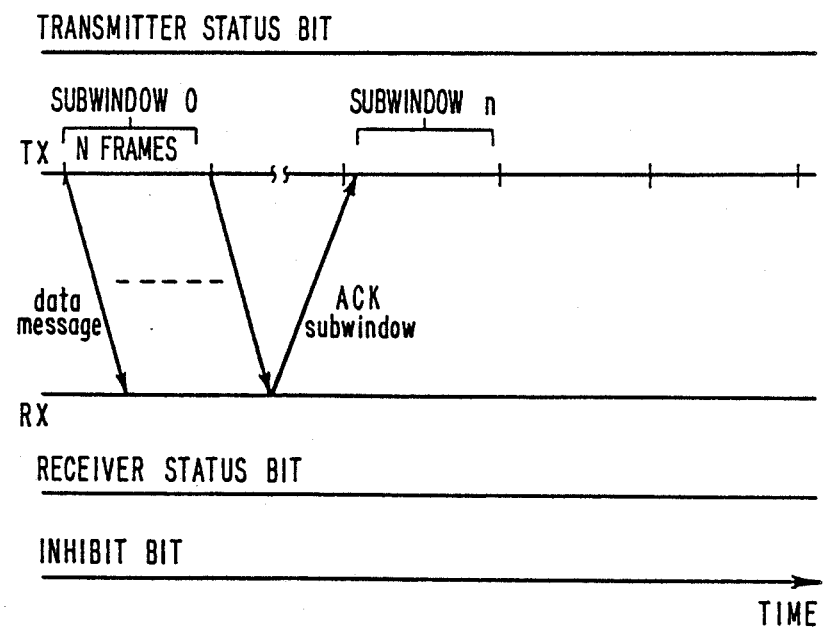
FIG. 13 is a timing diagram of normal DLC transmission and acknowledgement.

FIG. 13 demonstrates a normal DLC transmission and acknowledgement. "Transmit" is abbreviated by Tx and "receive" is abbreviated by Rx. First, the transmitter terminal 26 sends a data message with the transmitter status bit equal to 0. The receiver receives this message correctly and responds by sending an Ack signal upon the conclusion of the transmission of a sub-window. This same message exchange is repeated every time a sub-window is received correctly. Each sub-window is eight frames in this example. The sub-window size can be varied based on the BER of the link at that time. Also, since the Ack request is within the data message, the system 20 can change the frequency of Ack signals on a frame by frame basis.

FIG. 14 demonstrates the DLC error recovery mechanism. The transmitter terminal 26 initiates a data message with the transmit bit equal to 0. The data is received, in this example, incorrectly due to a CRC or sequence error. The receiver terminal 28 responds by starting an error message retry timer 82 which may be included within the control logic unit 48 of the receiver terminal 28. Since both of the control units 38 and 48 have the same construction so as to allow for the transmission of data in both directions across the link 30, the timer 82 is shown in the control logic unit 38 of FIG. 3. In this example, the transmitter terminal 28 responds further by setting the inhibit bit to inhibit the restarting of the timer 82, and sends an error message with the receive status bit set to 0. The transmit control unit 38, upon sensing the receive status bit of the error message equal to 0, responds by setting the transmit bit to 1, and initiates an error recovery cycle. The transmit terminal 26 reverts to the sub-window and frame specified in the error message and starts transmitting. The transmit terminal 26 now sends a data message with the transmit status bit now equal to 1. The receive terminal 28, upon sensing a data message with the transmit status bit equal to 1, responds by setting the received status bit to 1. It is assumed now that the data of the frame is received correctly. Thereupon, the receive terminal 28 sends an Ack message with the receive status bit equal to 1. The transmit terminal 26, upon receiving the Ack message resets the transmit status bit to indicate that the "Go BACK" state is complete.

The transmit terminal 26 continues to send the data packets that follow. The next data message has the transmit status bit equal to 0, and when received by the receive terminal 28, resets both the receive status bit and the inhibit bit. The error message retry timer 82 is reloaded and disabled until another erroneous data message with the transmit status bit equal to 0 is received. The timer 82 is disabled when the receive bit is 1. When the receive status bit is reset, the timer 82 is either restarted, if the data message which reset the receive status bit was incorrect, or is reloaded and disabled if the data received is correct. The timer 82 remains disabled until the next erroneous data message is received.

In the foregoing example, if a status of "Waiting for Ack" had been encountered by the transmit control unit 38, the control unit 38 would have initiated the message "I Need Status", and started the timer 82 at the transmitter control unit 38 to regulate the time between retransmissions of the message "I Need Status". The timer 82 is disabled when the transmit status bit is equal to 1, and is restarted when the transmit bit is reset if the condition "Awaiting Ack" still exists. The timer 82 is reloaded and disabled when the "Awaiting Ack" condition is alleviated at the transmit terminal 26.

The transmit and receive status bits, and the inhibit bit, are provided as a feature of the invention to ensure that the controlled and efficient algorithm for the "GO BACK, function can be implemented. These bits ensure that the "GO BACK' function is accomplished efficiently. The provision, in accordance with the invention, of the transmit and receive status bits allows the transmit terminal 26 and the receive terminal 28 to be synchronized with respect to the specific data frames being communicated without the need for excessively complex (smart) microprocessor at either terminal of the system 20. The provision, in accordance with the invention, of the inhibit bit blocks a constant restarting of the error timer with erroneous packet received, this saving power due to excess reloading. The foregoing operation of the system 20 is adaptive, the adaptive nature of the DLC allowing the characteristics of the control logic unit 38, as well as of the control logic unit 48, to vary in accordance with the BER of the link 30. The error rate may vary due to instability in the power supply of a laser driver employed with an optical configuration of the link 30.

With respect to performance of the system 20, the simplicity of the implementation of the 'Go-Back-N algorithm make the protocol feasible for very high speed communication lines. The throughput performance of the system 20 is characterized by a relatively low bit error rate, no larger than $10^{-9}$. Because of the 'GO-BACK" retransmissions, each unsuccessful packet transmission results in a waste of one round trip interval of link bandwidth. Let D be the round trip, C the link speed in bits per second, s the packet size, and N the number of packets which can be sent during D, namely, $N = D \times C / s$.

If a packet requires k total transmission to be delivered successfully, then the transmission consumes a bandwidth of $k(N+1)+1$. Based on packet error rate p, which is the product of BER and packet size, the average bandwidth consumption $$B = 1 + \sum_{k=1}^{\infty} (1-p)p^{k-1}(k-1)(N+1)$$
$$= \frac{1 + Np}{1 - p}$$

The sustained link throughput efficiency is therefore $$\text{Throughput} = \frac{1}{B} = \frac{1-p}{1+Np} \sim \frac{1}{1 + D\ C\ BER}$$

By setting $N=1$ the same analysis is applicable to an ideal DLC protocol in which each failed transmission waits only one packet transmission time. FIG. 4, as noted hereinabove, depicts a comparison of link throughput efficiency between the GO-BACK-N algorithm and an ideal DLC. It can be seen that for a BER no larger than $10^{-9}$, the two forms of control have almost identical performances.

FIG. 15 is a program flow chart useful in explaining operation of the transmit terminal 26 of FIG. 1. In FIG. 15, the program starts at block 86 by selecting the sub-window and packet size, shown at block 88, for operation of the transmit memory 32. The transmit memory 32 is cleared, at block 90, and the status bit for each frame 70 (FIG. 5) in each sub-window 74 is set to WRITE, as shown at block 92, for receipt of data from the user 22 (FIG. 1). At block 94, data from the user 22 is loaded into the transmit memory 32 after which, at block 96, the status bits are changed to READ of the frames which have been filled with data. Upon the filling of the frames with the data and the changing of the status to READ, the memory 32 is now ready to output the data to the receive terminal 28 via the link 30.

Reading out of the data is accomplished, beginning at block 98, by moving a READ pointer to designate the first frame of the sequence of frames from which data is to be transmitted as a packet. At block 100, the data of a frame is transmitted as a data packet via the link 30 to the receive terminal 28. Thereafter, at block 102, data of the next frame and of subsequent frames are transmitted serially in a sequence of packets to complete the transmission of data of all of the frames of a single sub-window. After the transmission of data from a frame, the status bits for the respective frames of the sub-window are reset to "Awaiting Acknowledgement", as shown at block 104. A request for status is sent at block 106, the request being for an acknowledgement signal. A failure to receive an acknowledgement signal will be dealt with in the program flow chart of FIG. 17.

Figure 15A:
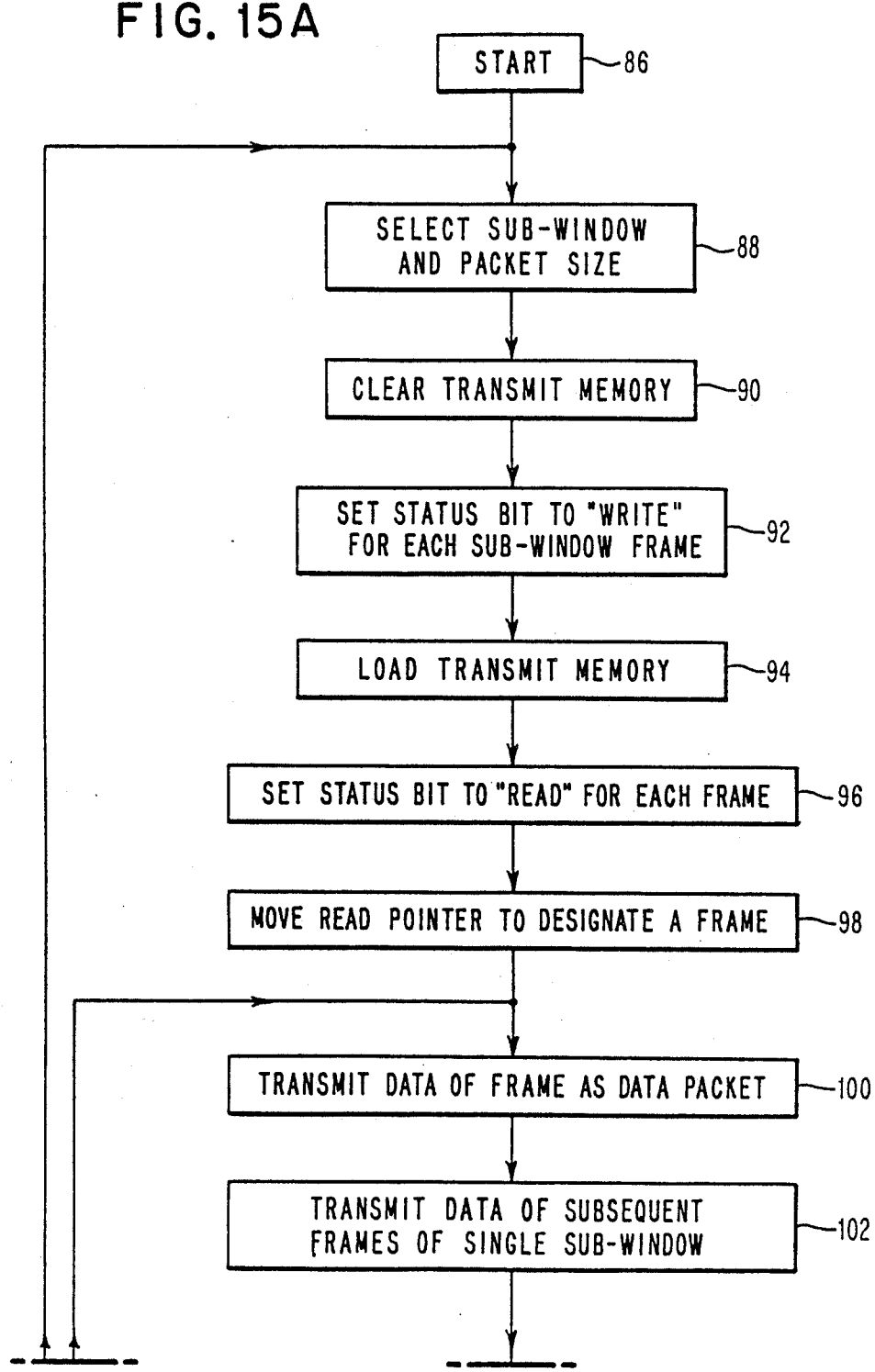
FIG. 15 is composed of two sheets of drawing identified as FIG. 15A and FIG. 15B which, taken together disclose a program flow chart for operation of the transmit terminal of FIG. 1.
Figure 15B:
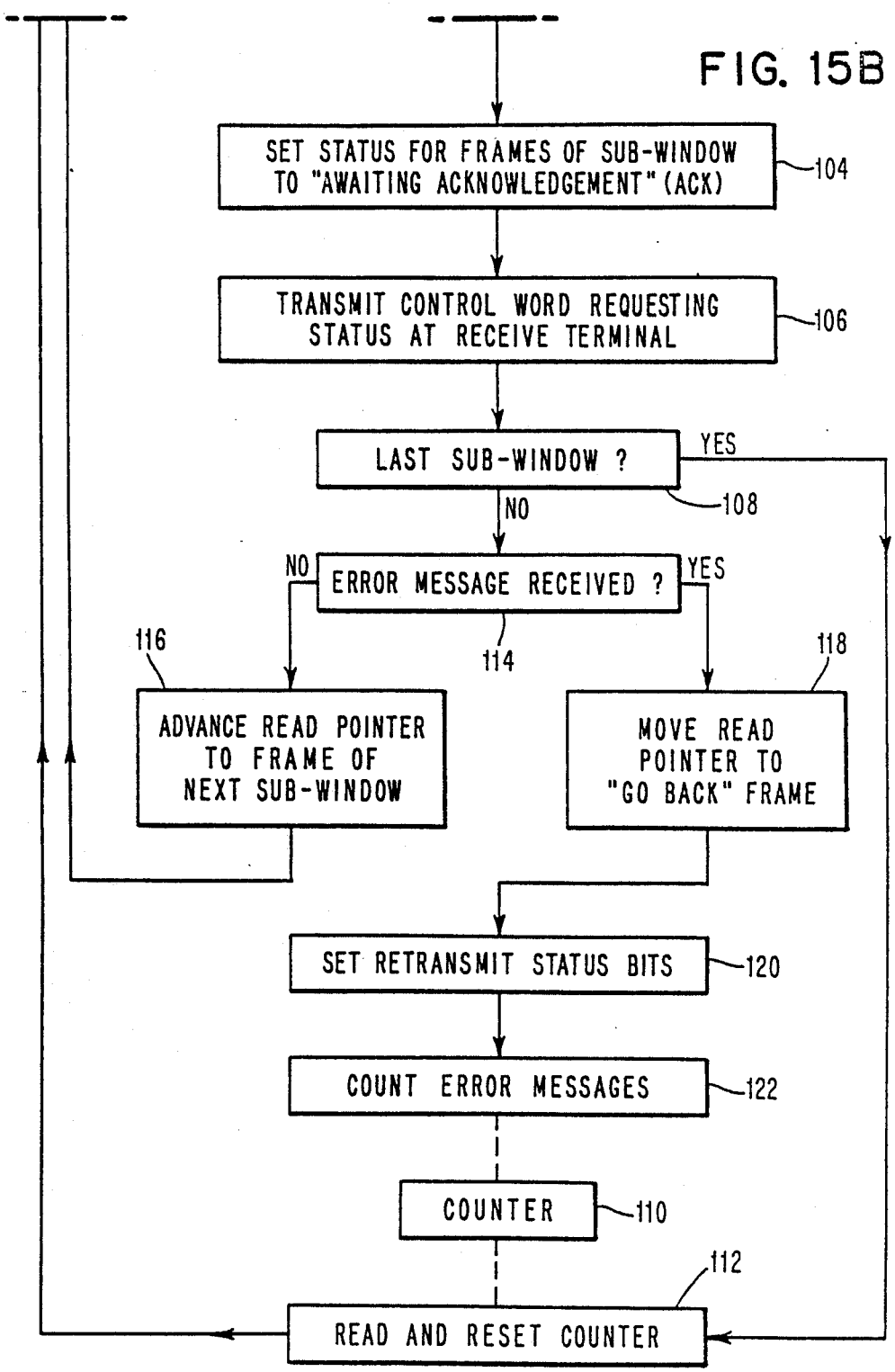

The flow chart of FIG. 15 continues at block 108 which is on the second drawing sheet of FIG. 15, the first drawing sheet being identified as FIG. 15A and the second drawing sheet being identified as FIG. 15B. Junction points A, B, and C are provided for joining together the portions of the charts of FIGS. 15A and 15B. For example, the chart flows from block 106 to block 108 via the junction point A. At block 108, the transmit terminal 26 checks as to whether the data of the last sub-window has been sent. An error counter, shown at block 110, is used to measure the frequency of occurrence of transmission errors so as to enable a selection of an appropriate sub-window size at block 88 to attain a desired frequency of acknowledgement signals commensurate with the error rate as has been described hereinabove. At block 108, if the last sub-window of data has been sent, then the operation proceeds to block 112 wherein the counter 110 is read and reset, the contents of the counter 110 being used in selecting the sub-window and packet size at block 88. The cycle of writing in data and reading out data would then be repeated after completion of the successful transmission of data of the last sub-window.

However, in the event that the last sub-window of data has not been transmitted, operation proceeds to block 114 to determine if an error message has been received. If no error message has been received, then the operation proceeds to block 116 wherein the READ pointer is advanced to the next frame of the sub-window from which data is to be transmitted to the receive terminal 28. The operation then reverts to block 100 for transmission of data of the next frame in a data packet.

At block 114, in the event that an error message has been received, then the operation proceeds to block 118 in which the READ pointer is moved back to a previously transmitted frame, which frame has been designated in the error message as having not been received at all, or having been received with error. This is in accordance with the GO-BACK-N frames algorithm employed in the operation of the invention. Thereupon, operation proceeds to block 120 where the status bits in the frame and in the data packet are set to indicate that the data packet is a retransmission of a previously transmitted block of data. The operation continues at block 122 for advancing a count of the counter 110 to indicate that an error message has been received. For each error message received during the transmission of a complete window of data of the transmit memory 32, the count of the counter 110 is advanced so that, at the conclusion of the transmission of the data of the window, the counter 110 shows the complete count of all error messages received during the transmission of the window data. In a fiber optic data link, the anticipated data error rate is very low, on the order of one error in $10^{14}$ bits. At such a low error rate, it is unlikely that more than one bit would in error in a data packet so that the bit error rate (BER) would be equal to the packet error rate. Therefore, the error counter at block 110, by counting the occurrences of erroneous packets, provides information useful in setting the sub-window size and acknowledgement repetition-frequency parameters suitable for operation in an environment of a specific BER.

Figure 16:
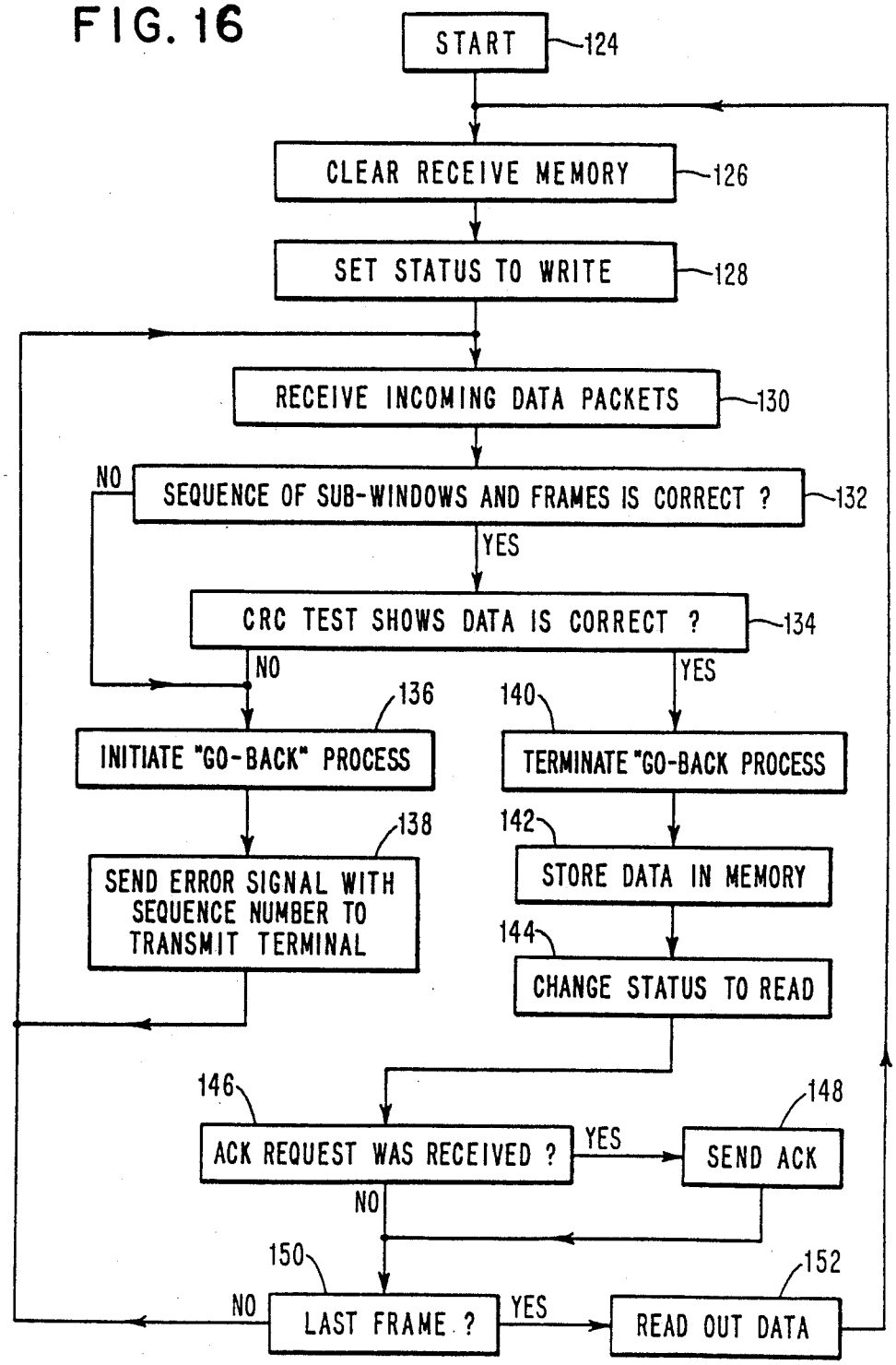
FIG. 16 discloses a program flow chart for operation of the receive terminal of FIG. 1.

At FIG. 16, the operation of the receive terminal 28 is described further with the aid of a program flow chart which starts at block 124. First, at block 126, the receive memory 42 is cleared, and the status bits at each of the frames of the memory 42 are set at block 128 to WRITE for storing data received by the terminal 28 from the terminal 26. The receiving of the incoming data packets occurs at block 130 after which, at block 132 the embedded bits designating the sequence number of each packet are examined to ascertain that the packet identifications agree with the memory frames into which the data is to be stored. A faulty sequence error could occur, by way of example, in the situation wherein a data packet was not received at the terminal 28 in which case the next packet to be received would appear to have a sequence number higher than the next packet which was anticipated to have been received. If the packet identification number is correct, then, at block 134, the cyclic redundancy check (CRC) accompanying the data in each packet is employed for determining that the data is correct and not corrupted by bit errors. A failure at block 132 to observe the correct sequence number, or a failure at block 134 to receive error-free data, results in the operation proceeding to block 136 wherein the terminal 28 initiates the GO-BACK process in which the transmit terminal 26 is commanded to go back to the previously transmitted frame data which experienced a transmission fault.

Upon initiating the GO-BACK process at block 136, the operation proceeds to block 138 wherein the receive terminal 28 sends an error signal to the transmit terminal 26, the error signal including the sequence number of the frame and packet experiencing the transmission failure. Thereupon, operation reverts to block 130 in which incoming data packets are received and examined at block 132 to determine if a retransmitted data packet having the right sequence number has been received. It is noted that there is no confusion between a retransmitted packet and the originally transmitted packet because the control word forming a part of the packet has bits embedded therein which identify the status of a packet as being an originally transmitted packet for a retransmitted packet.

At block 134, in the situation wherein data of a received packet is determined to be correct, the operation proceeds to block 140. At block 140, the GO-BACK process is terminated and the status bits at the frames of the receive memory can be set, as will be described now, to enable read-out of data from the memory 42 to the user 24. The operation proceeds to block 140 wherein the data is stored in the appropriate frame of the memory 42. It is noted that the frame number and the sequence number of the data packet are equal to insure that the data is stored in the correct frame in synchronism with the frame of the transmit memory 32 having the same identification or sequence number. After storing the data in the requisite frame, as described at block 142, the status bits of the frame are changed, at block 144 to READ to enable read-out of the data to the user 24.

The receive terminal 28 watches for acknowledgement requests, at block 146, transmitted from the transmit terminal 26. If an Ack request has been received, then an acknowledgement signal, at block 148, is sent from the receive terminal 28 to the transmit terminal 26. If no acquisition request has been received, or if such request has been received and responded to, the operation proceeds to block 150 in which the transmit terminal 28 ascertains whether the last frame of the memory 42 has been filled with data. If the last frame has been filled with data, or if a control word has been received indicating that no further data is to be be transmitted, operation then proceeds to block 152 wherein the data is read out of the memory 42 to the user 24. If, at block 150, the last frame has not been filled, nor has an end of transmission signal been received, then the operation reverts to block 130 for receipt of further incoming data packets.

Figure 17:
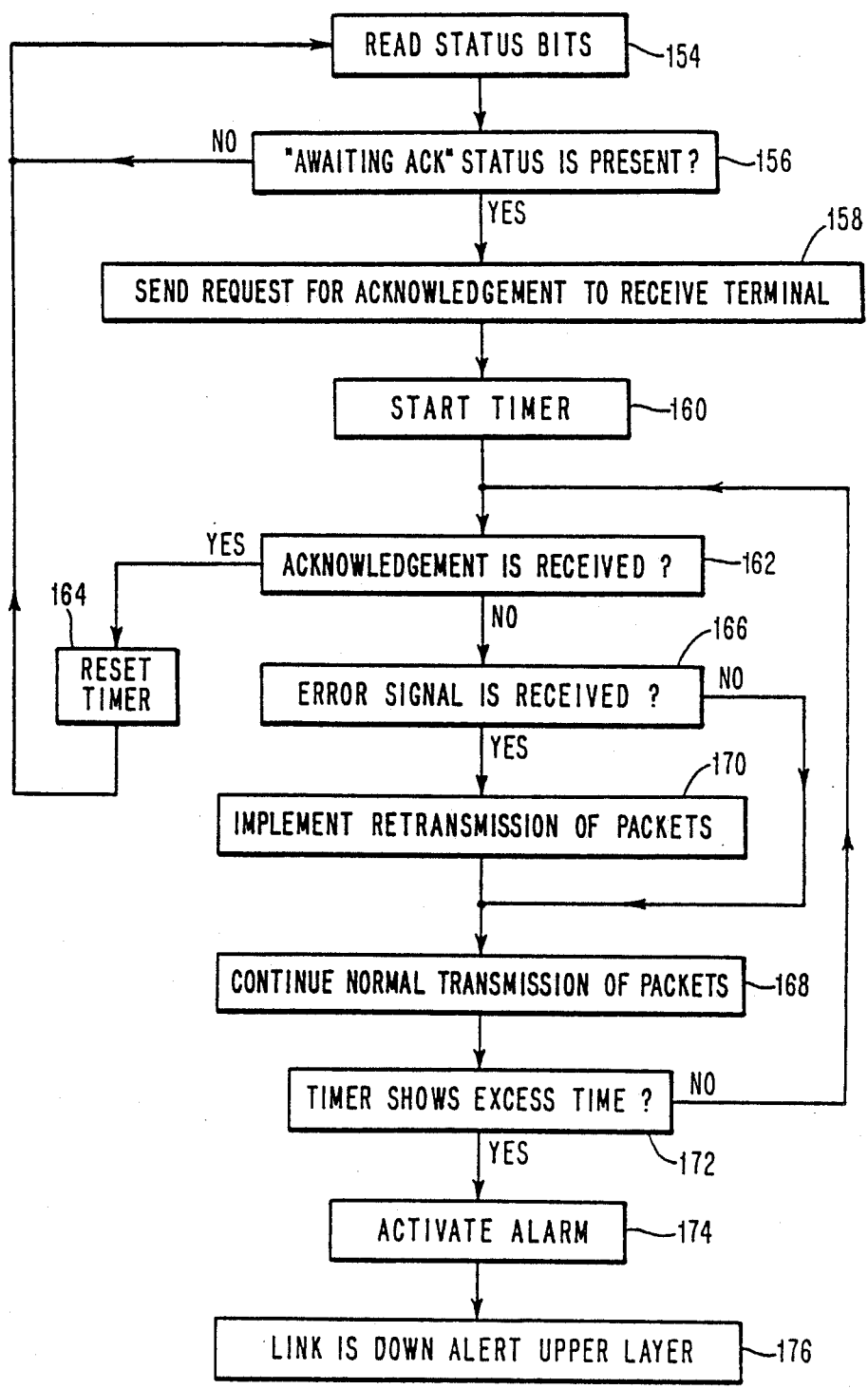
FIG. 17/is a program flow chart of an acknowledgment timing procedure.

FIG. 17 shows an aspect of the operation of the transmit terminal 26 by use of a program flow chart for timing an interval between a request for acknowledgement and receipt of the acknowledgement signal. The procedure begins at block 154 for a reading of the status bits of the data frames in the transmit memory 32 of FIG. 1. Upon reading the status bits, it is found at block 156 that the status "Awaiting Ack" may or may not be present. If the "Awaiting Ack" status is not present, operation reverts to a further reading of the status bits at block 154. If the "Awaiting Ack" status is present, operation proceeds to block 158 wherein the transmit terminal 26 sends a request for acknowledgement to the receive terminal 28. Upon requesting the acknowledgement, the timer 82 (FIG. 3) is started at block 160 to measure the time elapsed until an acknowledgement is received from the receive terminal 28.

The operation continues at block 162 wherein the transmit terminal 26 determines whether an acknowledgement has been received. If the acknowledgement has been received, then the timer 82 is reset at block 164 after which the operation reverts to block 154 for further reading of the status bit. At block 162, if no acknowledgement is received, then a determination is made at block 166 as to whether an error signal has been received at the transmit terminal 26 from the receive terminal 28. If no other signal has been received, the transmit terminal 26 continues to implement a normal transmission of packets at block 168. However, at block 166, if an error signal has been received, then the operation continues at block 170 for the implementation of a retransmission of the packet experiencing the transmission fault, as well as the retransmission of packets sent to the receive terminal 28 prior to receipt of the error signal. This is in accordance with the GO-BACK-N algorithm. Subsequent to the implementation of the retransmission procedure at block 170, normal transmission of data packets resumes at block 168.

The timer 82 which was started at block 160 continues to run, and at block 172 is read to see if an excessively long time interval has elapsed since the request for acknowledgement at block 158. If an excessively long time has elapsed, then an alarm is activated at block 174 to warn operating personnel at the transmit terminal 26 that the system 20 has malfunctioned and that data may not be reaching the receive terminal 28. Further, at block 176, the upper layer of the system architecture is alerted that the communication link is down, has malfunctioned. If, at block 172, an excessive time has not yet been measured then the operation reverts to block 162 for a further check as to whether the acknowledgement has been received. The operation continues to loop around between blocks 162 and 172 until either an acknowledgement signal is finally received, or until the alarm sounds at block 174 at which point the automatic operation is interrupted by personnel at both of the terminals 26 and 28 to take remedial action.

By virtue of the foregoing operation, the implementation of the architecture and protocol of the invention and the communication system has provided for a rapid speed of data transmission and a rapid speed of data recovery in the event that transmission errors are detected. This has been accomplished by arranging for the storage of data packets in transmit and receive memories having the same format of frame structure with identification numbers equal to the sequence numbers of the individual packets. Furthermore, the features of the invention have been made possible by the use of status bits and control words embedded within the data packets which provide both terminals with the same information as to the status of a packet to facilitate synchronization by means of hard-wired and programmable array logic units functioning as state machines. The state machines are responsive to specific events taking place in the communication system such as the detection of an error and the response of a terminal to the error.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A method of adaptively controlling a data link to compensate for variation in error in a transmission of data from a first terminal to a second terminal, the method comprising:
   storing data at the first terminal in a transmit memory as an array of data frames arranged in a window of the transmit memory;
   dividing the window into sub-windows each having less frames than said window;
   transmitting data from successive ones of said frames in a sequence of packets wherein data in a packet is obtained from one frame;
   embedding control signals in each of said packets, said control signals identifying packets by sequence number;
   receiving said packets at said terminals;
   checking said packets by tests for sequence number and bit error for detection of a transmission fault;
   storing data of only those packets which pass said tests in a receive memory at said second terminal, packets which fail at least one of said tests being rejected packets;
   retransmitting rejected packets from said first terminal to said second terminal;
   counting the number of rejected packets occurring during a transmission of a window of data to obtain a packet error rate; and altering the sizes of said sub-windows in accordance with the packet error rate to minimize the delay of re-transmission and increase the utilization of the link.

2. A method according to claim 1 further comprising a step of reporting back to said first terminal from said second terminal an error signal designating the sequence number of a rejected packet.

3. A method according to claim 2 wherein, during said step of retransmitting, there is a retransmission of packets which were transmitted subsequent to said rejected packets in accordance with a GO-BACK algorithm.

4. A method according to claim 3 wherein, during said step of retransmitting, there is a step of embedding in each packet of said rejected and said subsequent packets a control signal identifying each packet as a retransmitted packet.

5. A method according to claim 1 wherein, subsequent to the completion of transmission of all frames of a sub-window, there is a step of sending from said first terminal to said second terminal a request signal for acknowledgement, said request signal being embedded as a part of said control signal in a subsequently transmitted packet.

6. A method according to claim 5 further comprising a step of reporting back to said first terminal from said second terminal an acknowledgement signal acknowledging that packets previously received at said second terminal have passed said tests.

7. A method according to claim 6 further comprising a step of timing an interval of time elapsing between said request-for-acknowledgement signal and receipt of an acknowledgement signal.

8. A method according to claim 7 wherein, during said step of transmitting, there is a retransmission of packets which were transmitted subsequent to said rejected packet in accordance with a GO-BACK algorithm.

9. A method according to claim 8 wherein said timing of said interval includes time elapsed for retransmission of a rejected packet and wherein, upon detection of a transmission fault followed by a retransmission, acknowledgement follows said retransmission.

10. A method according to claim 1 wherein the sequence number is equal to the number of the frame in said window containing data of the packet bearing said sequence number.

11. A method according to claim 10 wherein data of said receive memory is stored in an array of frames in a window of said received memory identical to the array of frames in the window of said transmit memory.

12. A method of adaptively controlling a data link to compensate for variation in error in a transmission of data from a first terminal to a second terminal, the method comprising:

storing data at the first terminal in a transmit memory as an array of data frames arranged in a window of the transmit memory;

dividing the window into sub-windows each having less frames than said window;

transmitting data from successive ones of said frames in a sequence of packets wherein data in a packet is obtained from one frame;

embedding control signals in each of said packets, said control signals identifying packets by sequence number;

receiving said packets at said terminals;

checking said packets by tests for sequence number and bit error for detection of a transmission fault;

storing data of only those packets which pass said tests in a receive memory at said second terminal, packets which fail at least one of said tests being rejected packets;

retransmitting rejected packets from said first terminal to said second terminal;

counting the number of rejected packets occurring during a transmission of a window of data to obtain a packet error rate;

altering the sizes of said sub-windows in accordance with the packet error rate to maximize a speed of data transmission along said data link;

reporting back to said first terminal from said second terminal an error signal designating the sequence number of a rejected packet;

wherein, during said step of retransmitting, there is a retransmission of packets which were transmitted subsequent to said rejected packets in accordance with a GO-BACK algorithm;

during said step of retransmitting, there is a step of embedding in each packet of said rejected and said subsequent packets a control signal identifying each packet as a retransmitted packet;

the sequence number is equal to the number of the frame in said window containing data of the packet bearing said sequence number; and data of said receive memory is stored in an array of frames in a window of said received memory identical to the array of frames in the window of said transmit memory.

13. A method according to claim 12 wherein subsequent to the completion of transmission of all frames of a sub-window, there is a step of sending from said first terminal to said second terminal a request signal for acknowledgement, said request signal being embedded as a part of said control signal in a subsequently transmitted packet; the method further comprising a step of reporting back to said first terminal from said second terminal an acknowledgement signal acknowledging that packets previously received at said second terminal have passed said tests.

14. A method of adaptively controlling a data link to compensate for variation in error in a transmission of data from a first terminal to a second terminal, the method comprising:

storing data at the first terminal in a transmit memory as an array of data frames arranged in a window of the transmit memory;

dividing the window into sub-windows each having less frames than said windows;

transmitting data from successive ones of said frames in a sequence of packets wherein data in a packet is obtained from one frame;

embedding control signals in each of said packets, said control signals identifying packets by sequence number;

receiving said packets at said terminals;

checking said packets by tests for sequence number and bit error for detection of a transmission fault;

storing data of only those packets which pass said tests in a receive memory at said second terminal, packets which fail at least one of said tests being rejected packets;

retransmitting rejected packets from said first terminal to said second terminal;

reporting back to said first terminal from said second terminal an error signal designating the sequence number of a rejected packet;

counting the number of error signals occurring during the transmission of a window of data to obtain a packet error rate;

wherein the sequence number is equal to the number of the frame in said window containing data of the packet bearing said sequence number;

data of said receive memory is stored in an array of frames in a window of said received memory identical to the array of frames in the window of said transmit memory;

subsequent to the completion of transmission of all frames of a sub-window, there is a step of sending from said first terminal to said second terminal a request signal for acknowledgement, said request signal being embedded as a part of said control signal in a subsequently transmitted packet;

said method further comprising reporting back to said first terminal from said second terminal an acknowledgement signal acknowledging that packets previously received at said second terminal have passed said tests; and wherein an error signal is produced by comparing sequence numbers of stored data in said receive memory with frame numbers of frames storing data; said method further comprising a step of altering a repetition frequency of the acknowledgement - request signals in accordance with the packet error rate to maximize a speed of data transmission along said data link.

15. A method of adaptively controlling a data link to compensate for variation in error in a transmission of data from a first terminal to a second terminal, the method comprising:

transmitting a sequence of data packets from said first terminal to said second terminal to be received at said second terminal;

sending a request signal from said first terminal for acknowledgement of receipt of the data packets by said second terminal, said sending being done periodically after a predetermined number of data packets;

reporting back to said first terminal from said second terminal, in response to said acknowledgement - request signal, a response signal acknowledging receipt of error - free packets, said response signal being an error signal in the case of receipt of a packet with error;

retransmitting packets which were received with error in accordance with a GO-BACK algorithm;

formulating a packet error rate by comparing the number of error signals with the number of packets transmitted; and altering a repetition frequency of said acknowledgement - request signals in accordance with said packet - error rate, an increase in error rate producing an increase in said repetition frequency so as to increase the transmission speed of a sequence of data packets.

16. A method according to claim 15 further comprising:

identifying each packet with a sequence number;

rejecting a packet having an error;

reporting back to said first terminal from said second terminal an error signal designating the sequence number of a rejected packet;

embedding control signals in each of said packets, said control signals identifying packets by sequence number; and wherein, during said step of retransmitting, there is a step of embedding in each packet a control signal identifying each packet as a retransmitted packet.

17. A method of adaptively controlling a data link to compensate for variation in error in a transmission of data from a first terminal to a second terminal, the method comprising:

storing data at the first terminal in a transmit memory as an array of data frames arranged in a window of the transmit memory;

dividing the window into sub-windows each having less frames than said window;

transmitting data from successive ones of said frames in a sequence of packets wherein data in a packet is obtained from one frame;

embedding control signals in each of said packets, said control signals identifying packets by sequence number;

receiving said packets at said terminals;

checking said packets by testing for a transmission fault;

storing data of only those packets which pass said testing in a receive memory at said second terminal, packets which fail said testing being rejected packets;

retransmitting rejected packets from said first terminal to said second terminal;

obtaining a packet error rate by monitoring rejected packets occurring during a transmission of a window of data; and altering the sizes of said sub-windows in accordance with the packet error rate to maximize a speed of data transmission along said data link.

* * * * *